US008949814B2

(12) United States Patent
Green et al.

(10) Patent No.: US 8,949,814 B2
(45) Date of Patent: Feb. 3, 2015

(54) PROVIDING A SOFTWARE UPGRADE RISK MAP FOR A DEPLOYED CUSTOMER SYSTEM

(75) Inventors: Matthew John Green, Gold Coast (AU); Christopher John Hockings, Burleigh Waters (AU); Trevor Scott Norvill, Parkwood (AU); Richard A. Speter, Gold Coast (AU)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 13/531,336

(22) Filed: Jun. 22, 2012

(65) Prior Publication Data

US 2013/0346956 A1 Dec. 26, 2013

(51) Int. Cl.
*G06F 9/44* (2006.01)

(52) U.S. Cl.
USPC .......................................................... 717/168

(58) Field of Classification Search
CPC .............. G06F 9/44; G06F 8/65; G06Q 10/04
USPC .......................................................... 717/168
See application file for complete search history.

(56) References Cited

U.S. PATENT DOCUMENTS

| | | | |
|---|---|---|---|
| 7,185,326 B2 * | 2/2007 | McIntosh et al. | 717/151 |
| 7,191,435 B2 * | 3/2007 | Lau et al. | 717/168 |
| 8,589,555 B2 * | 11/2013 | Chen et al. | 709/226 |
| 2011/0067005 A1 * | 3/2011 | Bassin et al. | 717/127 |
| 2012/0060142 A1 * | 3/2012 | Fliess et al. | 717/102 |
| 2012/0204168 A1 * | 8/2012 | Charters et al. | 717/170 |
| 2013/0346956 A1 * | 12/2013 | Green et al. | 717/168 |

OTHER PUBLICATIONS

Arisholm et al., "Predicting Fault-prone Components in a Java Legacy System," Proceedings of the 2006 ACM/IEEE International Symposium on Empirical Software Engineering, Sep. 2006, 10 pages.
Mockus et al., "Predicting Risk of Software Changes," Bell Labs Technical Journal, Apr.-Jun. 2000, pp. 169-180.

* cited by examiner

*Primary Examiner* — Don Wong
*Assistant Examiner* — Theodore Hebert
(74) *Attorney, Agent, or Firm* — VanLeeuwen & VanLeeuwen; Thomas E. Tyson (57) ABSTRACT

An approach is provided that receives and processes a software change package. The software change package includes changes to an installed software product. Change metadata corresponding to the changes included in the software change package is also received. Support data corresponding to the software change package is also received with the support data includes evaluation data that corresponds to the software change package. The evaluation data being data that was gathered from other customer installations of an upgraded software product that previously installed the software change package. Customer configuration data items are retrieved and the customer configuration data items are analyzed along with the received change metadata and the received support data in order to generating an upgrade risk map.

17 Claims, 8 Drawing Sheets

PROVIDING A SOFTWARE UPGRADE RISK MAP FOR A DEPLOYED CUSTOMER SYSTEM

TECHNICAL FIELD

The present disclosure relates to an approach that provides software application consumers with an upgrade risk map based on various internal an external factors provided by the system.

BACKGROUND OF THE INVENTION

New versions of software typically contain a combination of previous release functions, new release functions and software defect fixes. New functions may be either functional or non-functional and, to any customer, each function may represent opportunity and/or risk. Where the motivation for upgrade is not for new feature consumption, many customers are concerned about the risk of an upgrade to a stable system. This concern arises from the fact that new software contains features delivered as a change to an existing, stable, operational environment. Although the enhanced functionality may help the customer justify the change to their business (and may be mandated to stay current with software maintenance agreements), the customer often seeks to assess the risk of the change to the current environment. In traditional environments, such an assessment is often based upon a "gut feel" of the stability of a system, as the decision maker generally lacks important data that would be helpful in making an objective decision. Current methods of managing this risk include testing where exhaustive regression testing is performed across the entire deployment functions. Another method is informal vendor interaction where customers ask the vendor for some understanding of the scale of changes in the released product. This is often difficult to provide, as it's generally only known by the developer themselves, who have a view of the functional change, but may not understand the potential impact of the change to an entire software system. Another approach is for the customer to wait for the first "fix-pack" before upgrading a major release. This is a common risk mitigating approach used in traditional systems with the focus being to delay upgrading unless there is a clear business need for a new feature included in a product release. A challenge of this approach, however, is that it delays the software life cycle and may provide service difficulty with the vendor when the customer is running a back-level version of the product.

SUMMARY

An approach is provided that receives and processes a software change package. The software change package includes changes to an installed software product. Change metadata corresponding to the changes included in the software change package is also received. Support data corresponding to the software change package is also received with the support data includes evaluation data that corresponds to the software change package. The evaluation data being data that was gathered from other customer installations of an upgraded software product that previously installed the software change package. Customer configuration data items are retrieved and the customer configuration data items are analyzed along with the received change metadata and the received support data in order to generating an upgrade risk map.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
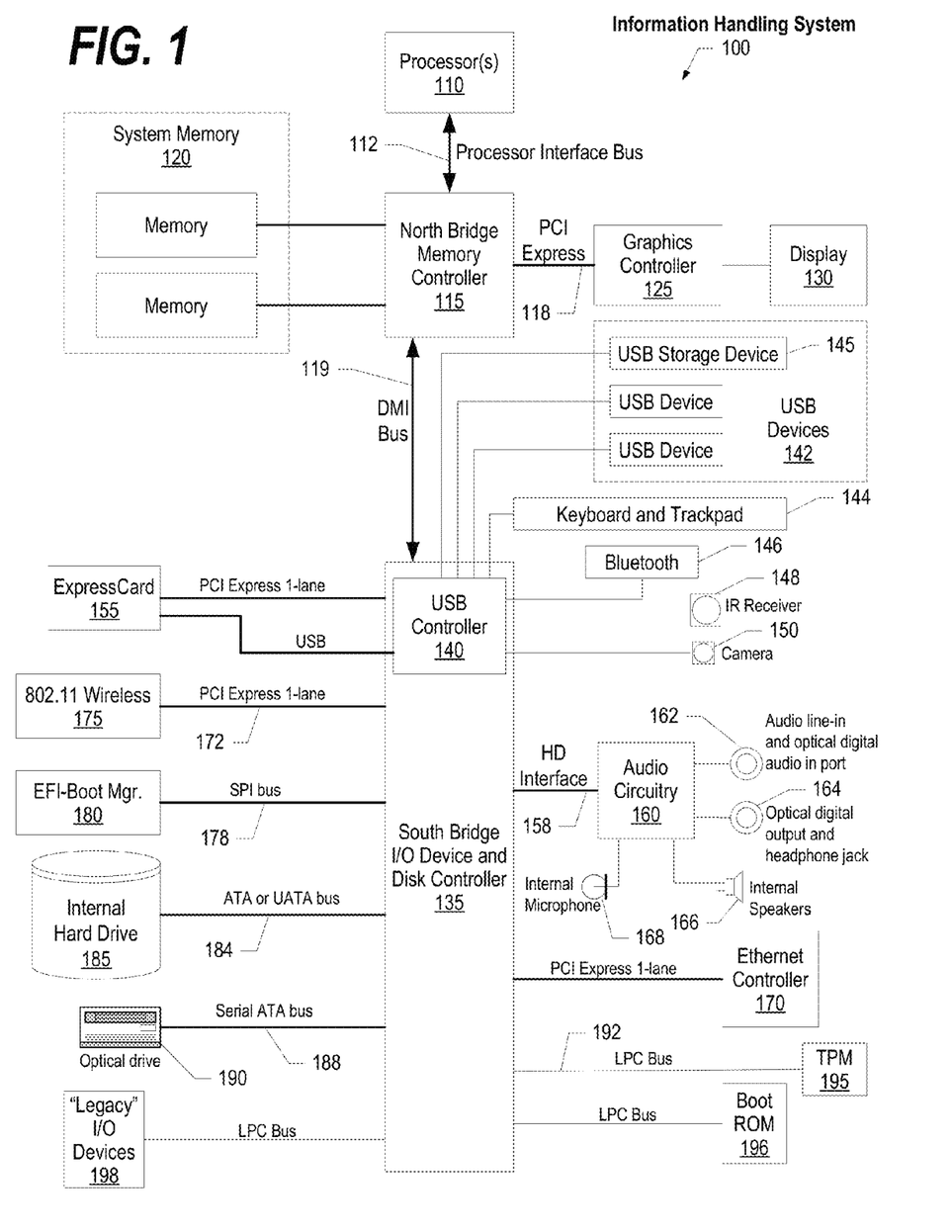
FIG. 1 is a block diagram of a data processing system in which the methods described herein can be implemented.
Figure 2:
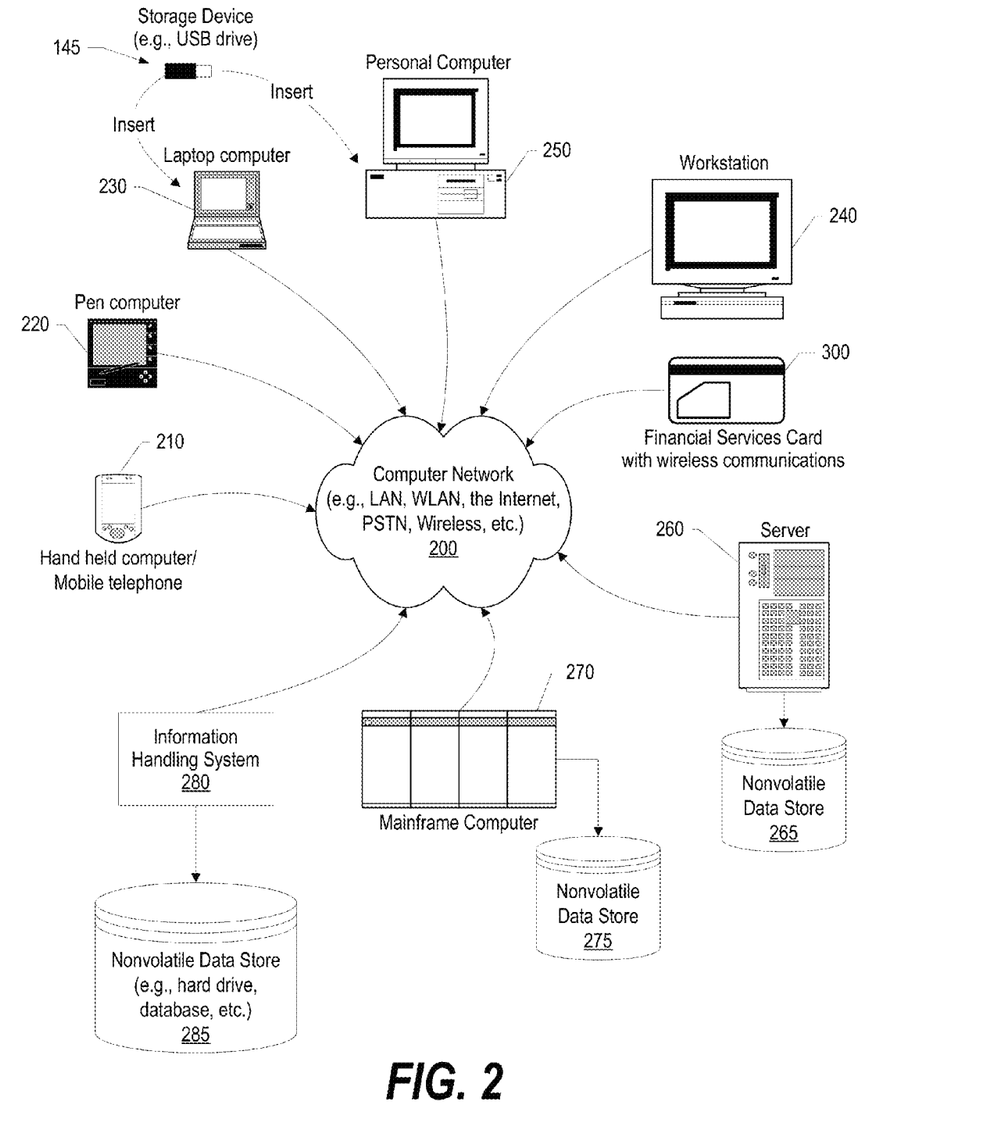
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
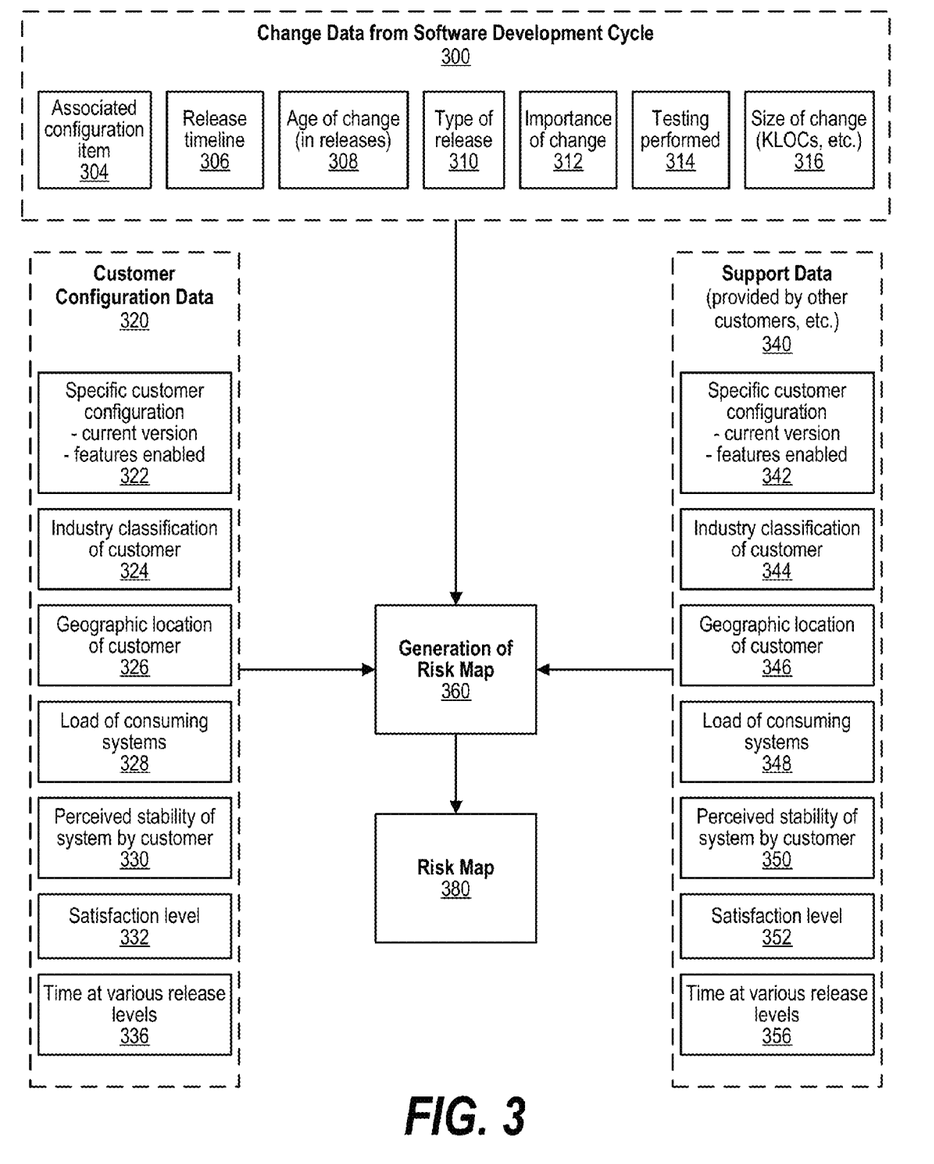
FIG. 3 is a component diagram depicting various components used to generate a software upgrade risk map.

FIG. 3 is a component diagram depicting various components used to generate a software upgrade risk map. Change data from the software development life cycle (300) pertains to data and activities of the vendor that provided a software product installed at the customer and is now providing a software change packet designed to upgrade the software product. However, before deciding the install the software change package that includes one or more changes to the installed product, process 360 is performed to generate upgrade risk map 380 based on an analysis of various factors related to the software change package.

As shown, change data from the software development life cycle (300) is change metadata that includes a variety of data items including associated configuration item (304), release timeline (306) detailing the timeline of the various upgrades to the installed product including the software change package, and age of change (308) that details the age (e.g., in days, etc.) of the software change package. Further data items in change data 300 include type of release (310), such as a bug fix, enhancement, major release, etc., and importance of change (312), such whether the change package addresses a major security issue (important change) or addresses minor or cosmetic issues related to the installed product (unimportant changes). Change data 300 also includes testing performed (314), such as whether compatibility testing was performed, whether static and/or dynamic testing was used, whether software verification was performed, whether software validation was performed, time spent testing the software product after the software change package was applied, etc. Finally, objective measures of the size (316) or scope of the software change package, such as the size of the code (e.g., in KLOCs, etc.) can be included in change data 300.

Customer configuration data 320 pertains to the customer that is considering applying the software change package to the installed software package used by the customer (e.g., at a system owned/managed by the customer, at a service provided in a cloud-based environment, etc.). As shown, customer configuration data 320 also includes several components that describe the customer's usage of the installed software product, the customer's business, and other factors pertaining to the customer. Some of this data may be shared with other customers as feedback data when the other customers are evaluating whether to apply the software change package to their installed software product.

Customer configuration data 320 includes specific customer software configuration data 322 that includes data such as the current version of the installed software product being used by the customer, and the features of the installed software product that have been enabled for use by the customer's agents and employees. Customer configuration data 320 also includes such information as the industry classification of the customer (324), such as retail, banking, consumer services, etc., as well as the geographic location of the customer (326), such located in a particular city, province, country, worldwide, etc. Customer configuration data 320 also includes the current load of the customer's computer systems 328 as well as the customer's perceived stability (330) of the computer system that is running the installed software product. In addition, customer configuration data 320 includes the customer's satisfaction level (332) with the installed software product as well as the amount of time (336) that the customer has been at the current release level of the software product installed on the customer's system as well as the amount of time the customer spent at previous release levels previously installed on the customer's computer system.

Support data 340 includes data that is provided by other customers and shared (e.g., anonymously, etc.) with the user community to provide real-world experience feedback data of actual customers that are using the software product as well as customers that have applied the software change package provided by the vendor. Support data 340 includes many of the data items in customer configuration data 320. Some of these data items are used to compare customer situations with one another in order to determine an affinity (similarity) level between customers, while other data items are used to provide feedback data to other customers regarding the customers' experiences (e.g., experiences, satisfaction with the software product after applying the software change package supplied by the vendor, etc.). Support data 340 includes specific customer software configuration data 342 that includes data such as the current version of the installed software product being used by the customers, and the features of the installed software product that have been enabled for use at the customers' installations. Support data 340 also includes such information as the industry classification of the customers (344), such as retail, banking, consumer services, etc., as well as the geographic location of the customers (346), such located in a particular city, province, country, worldwide, etc. Support data 340 also includes the current load of the customers' computer systems that are running the software product (348) as well as the customers' perceived stability (350) of the computer systems that are running the installed software products. In addition, support data 340 includes the customers' satisfaction levels (352) with the installed software product as well as the amount of time (356) that the customers have been using the current release level of the software product as well as the amount of time the customers spent at previous release levels previously installed on the customers' computer systems.

As described in further detail herein, process 360 receives change data 300 resulting from the vendor's software development life cycle, the evaluating customer's configuration data 320, and support data 340 provided by other customers of the software product. Process 360 takes the various inputs from the various sources in order to generate risk map 380 which can be used by the customer's decision makers (e.g., IT specialists, management, etc.) in order to understand the risks and determine whether to apply a software change package to the customer's installed software product.

Figure 4:
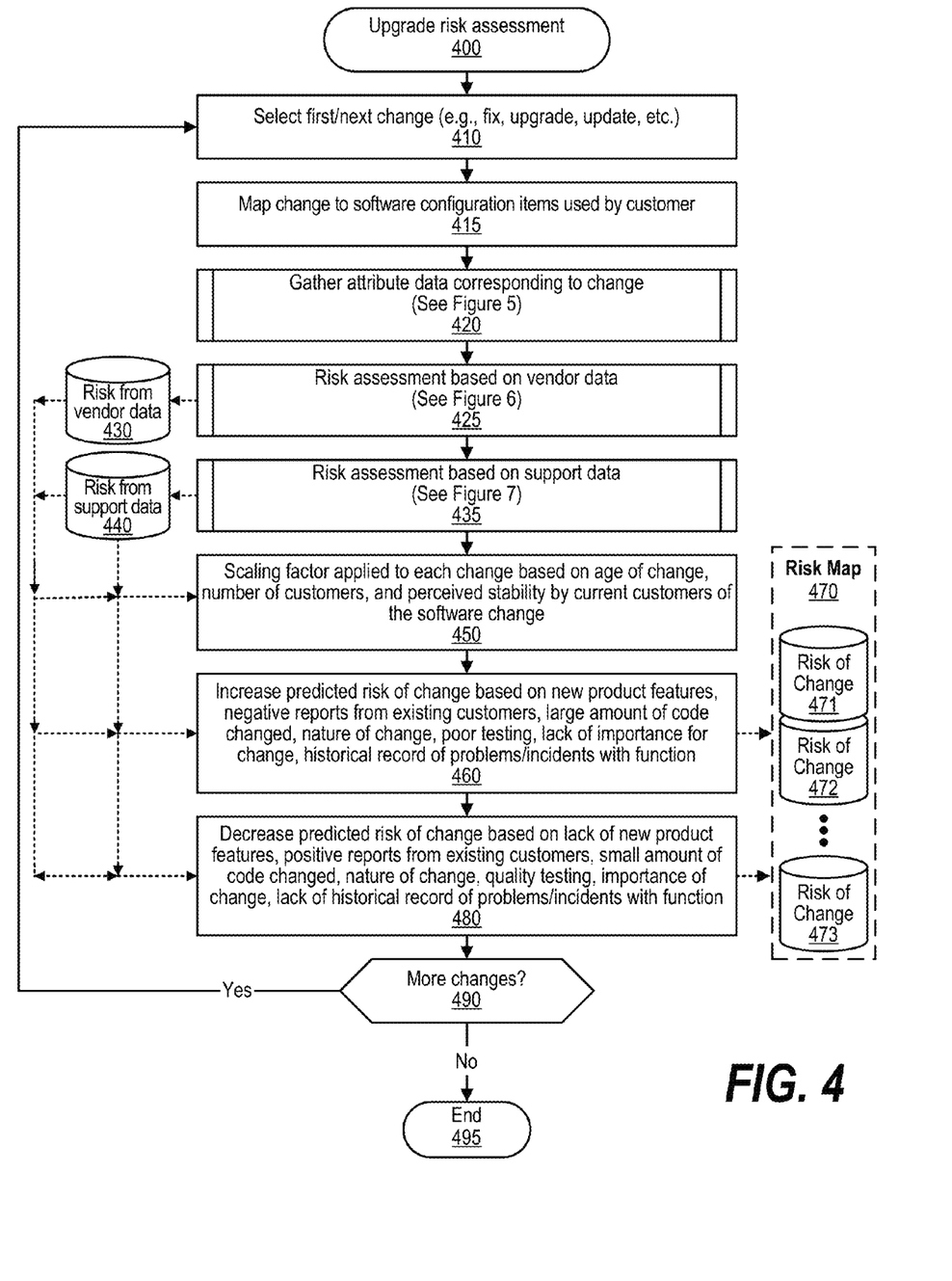
FIG. 4 is a high-level flowchart showing the overall steps taken to generate a software upgrade risk map for a customer.

FIG. 4 is a high-level flowchart showing the overall steps taken to generate a software upgrade risk map for a customer. Processing commences at 400 whereupon, at step 410, the first change in the software change package received from the software vendor is selected. The change package, as well as the selected change, can be any type of fix, upgrade (substantive or cosmetic), upgrade, major release, or the like. At step 415, the selected change is mapped to the software configuration items set (used) by the customer. The customer's software configuration items were previously described in FIG. 3, element 320. Included in this mapping step is identifying components/features of the software product that are being addressed in the change with those features that have been enabled by the customer.

Figure 5:
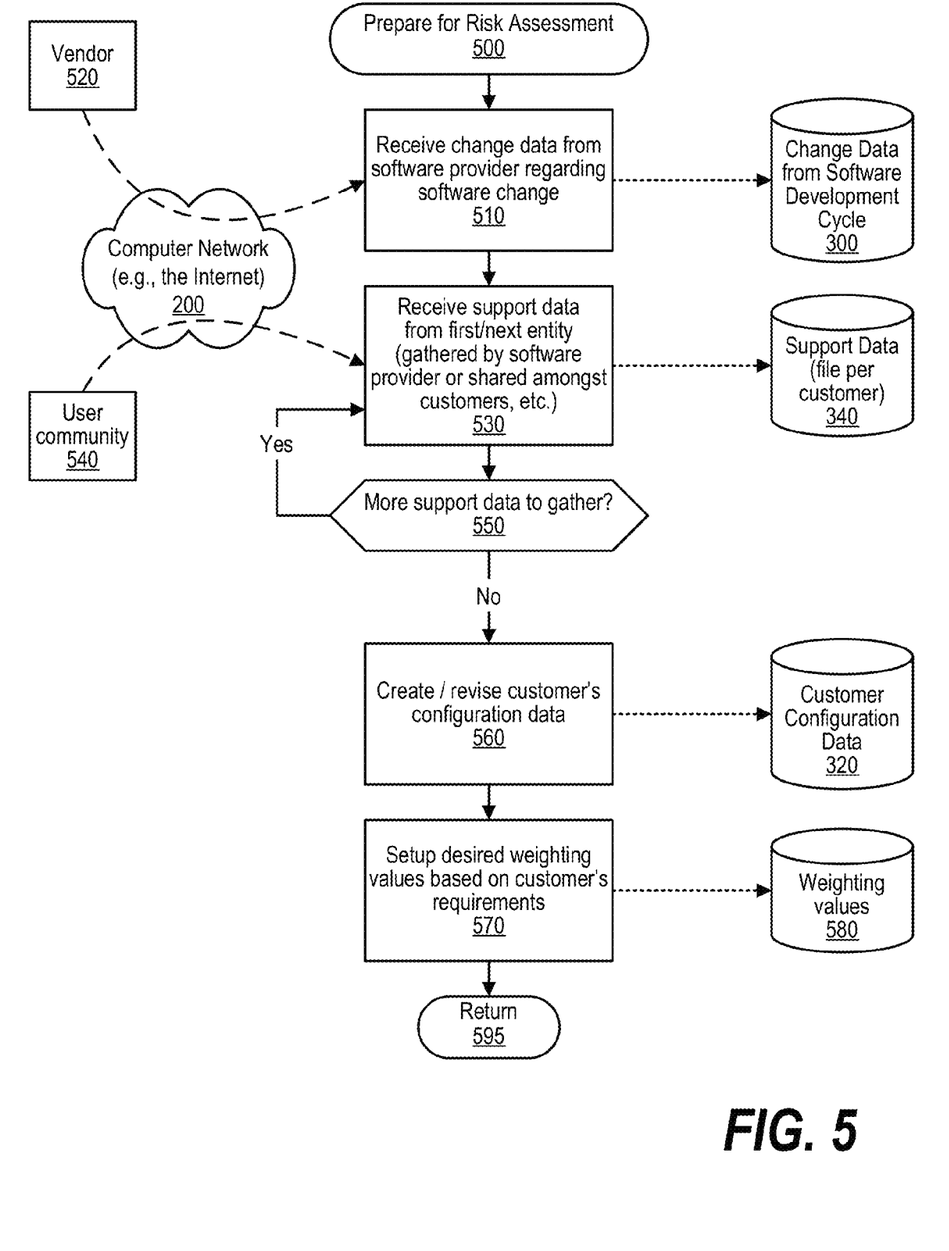
FIG. 5 is a flowchart showing steps performed in gathering attribute data associated with a change to a software product.

At predefined process 420, the process gathers attribute data received from various sources including the software vendor and other customers of the software product (see FIG. 5 and corresponding text for processing details). Attribute data supplied by the vendor was previously described in FIG. 3, element 300. In addition, attribute data provided by other customers (support data) was previously described in FIG. 3, element 340. Also, the customer itself provides configuration data items previously described in FIG. 3, element 320 as well as providing various weighting values based on the customer's requirements (e.g., goals, objectives, etc.) pertaining to the software product.

Figure 6:
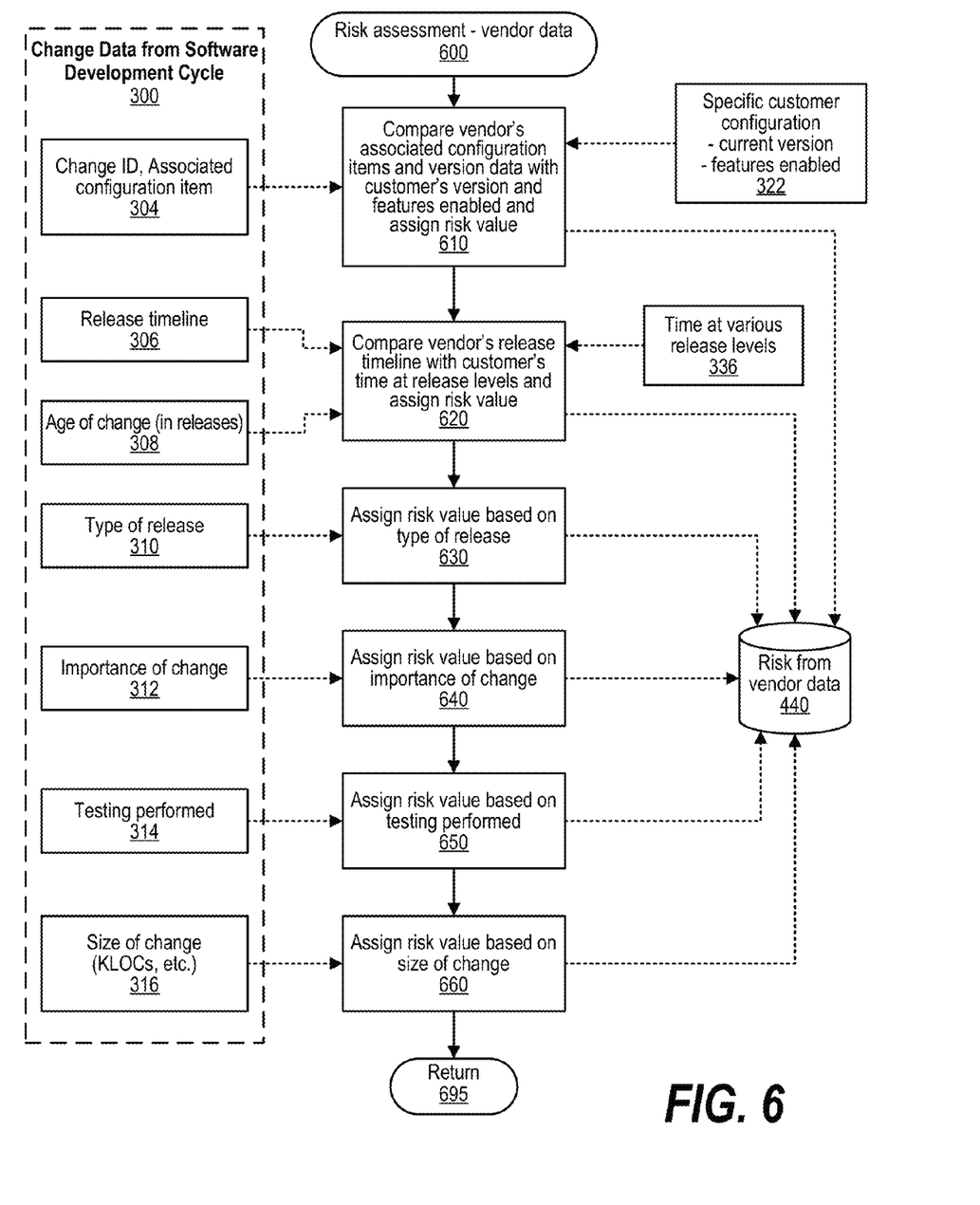
FIG. 6 is a flowchart showing steps performed in assessing risk of the change to the software product based on vendor supplied data.

At predefined process 425, a risk assessment regarding the software change package is performed on the vendor-supplied data (see FIG. 6 and corresponding text for processing details). For example, if the software change package received minimal testing, the risk of applying the software change package would be greater than if the software change package received extensive testing before being released by the vendor. The result of the risk assessment performed at predefined process 425 is risk from vendor data 430.

Figure 7:
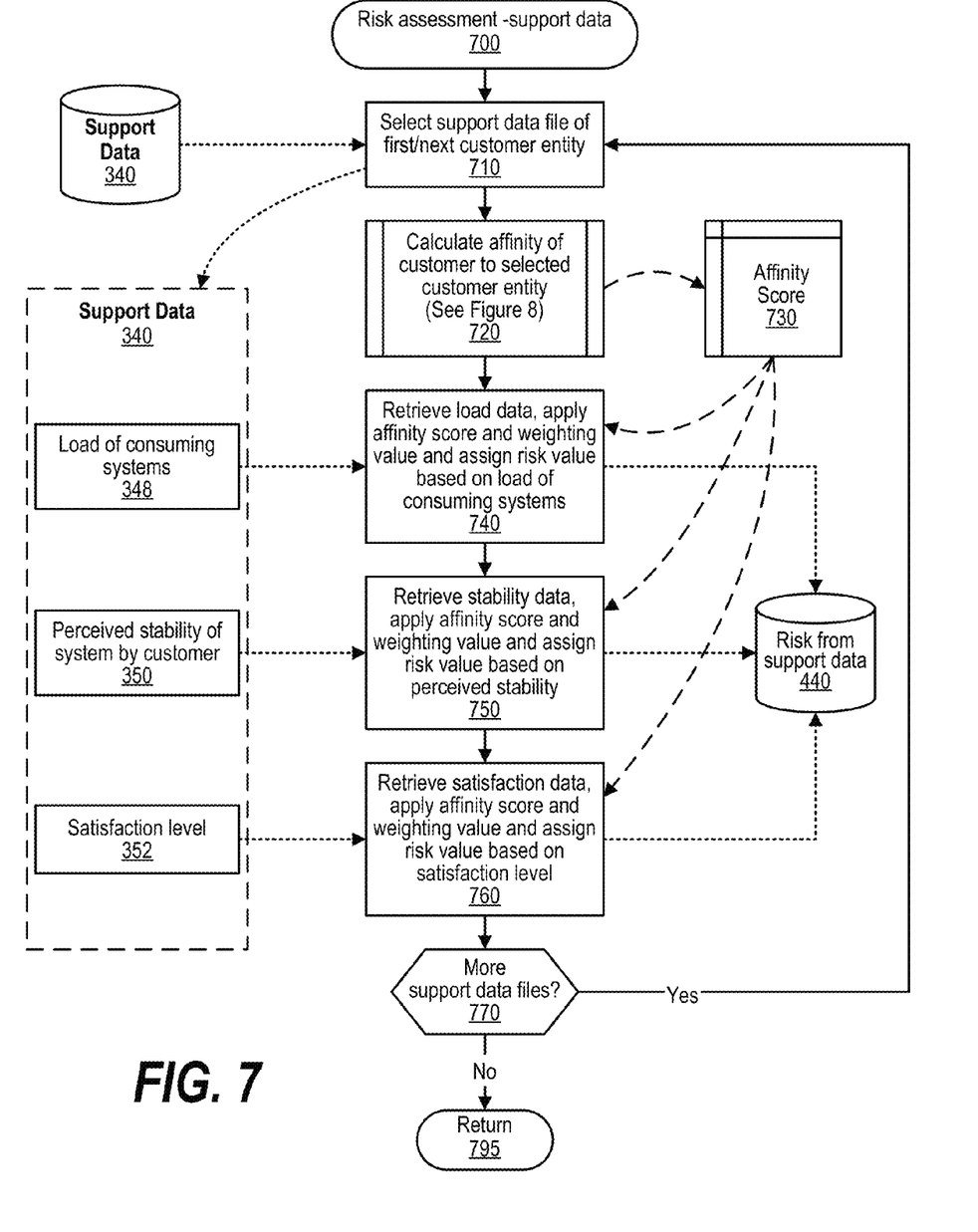
FIG. 7 is a flowchart showing steps performed in assessing risk of the change to the software product based on supportive data available to the customer.

At predefined process 435, a risk assessment regarding the software change package is performed using data supplied by other customers of the software product, especially those who have applied the software change package (see FIG. 7 and corresponding text for processing details). For example, if the software change package was applied by similar customers with disastrous results, the risk of applying the software change package would be greater than if the software change package was installed by the other customers and garnered increased satisfaction with the software product. The result of the risk assessment performed at predefined process 435 is risk from support data 440.

At step 450, a scaling (or weighting) factor is applied to each change in the software change package based on factors such as the age of the change (length of time the change has been offered by the vendor), number of customers that have applied the software change package to their respective software products (customer base size), as well as the customers' perceived stability of the software package after having the software change package applied to their respective installed software products.

At step 460, the predicted risk due to the selected change is increased based on new product features being introduced with the change, negative reports from existing customers regarding the change, large amount of code added, deleted, or modified to make the change, the nature of change (e.g., directed at cosmetic issues, etc.), poor testing used to test the change, a lack of importance for the change, and a historical track record indicating a history of problems and incidents with the function altered by the change. The risk of change is reflected in a risk of change data store associated with each change (471, 472, 473) which, together, form risk map 470 that provides an informative map regarding the risks of applying the software change package to the customer's installed software product.

Conversely to step 460, some factors are used to decrease the risk of changed. At step 480, the predicted risk due to the selected change is decreased based on lack of new product features being introduced with the change, positive reports from existing customers regarding the change, small amount of code added, deleted, or modified to make the change, nature of change (e.g., directed at minor bug fixes, etc.), quality testing performed to test the changed code, importance of change (e.g., addresses a major security issue, etc.), and a lack of historical track record that might otherwise indicate possible history of problems and incidents with the function altered by the change.

A decision is made as to whether there are additional changes in the software change package (decision 490). If there are additional changes, then decision 490 branches to the "yes" branch which loops back to select and process the next change in the software change package as described above. This looping continues until all of the changes in the software change package have been processed creating a full risk map (470) which can be used by the customer to decide whether to apply the software change package to the customer's installed software product. After all of the changes have been processed, then decision 490 branches to the "no" branch whereupon processing ends at 495.

FIG. 5 is a flowchart showing steps performed in gathering attribute data associated with a change to a software product. Processing commences at 500, whereupon, at step 510 change data resulting from the vendor's software development life cycle is received from vendor 520 and stored in change data store 300. Details of the types of data included in change data store 300 were previously described in FIG. 3, element 300. In one embodiment, the change data is received from vendor 520 over a computer network, such as the Internet.

At step 520, support data is received from other customers of the software product (user community 540). In one embodiment, the support data is gathered by the vendor or a third party that shares the support data amongst the user base of the software product. Support data, in one embodiment, is transmitted to the customer via a computer network, such as the Internet. In some environments, support data may be received from multiple entities (e.g., other customers of the software product, etc.). A decision is made as to whether there are more support data to gather from these multiple entities (decision 550). If there are more support data to gather from these entities, then decision 550 branches to the "yes" branch which loops back to continue receiving the support data. The support data is stored in support data store 340. Details of the types of data included in support data 340 were previously described in FIG. 3, element 340. When all of the available support data has been gathered, then decision 550 branches to the "no" branch to continue preparing the customer for the risk assessment.

At step 560, the customer creates customer configuration data store 320 (or revises the data store as necessary if the data store already exists). Details of the types of data included in customer configuration data 320 were previously described in FIG. 3, element 320. At step 570, the customer can provide desired weighting values that are used during the generation of the risk assessment. These weighting factors are applied to metadata corresponding to each change in the software change package based on the customer's current requirements (e.g., goals, objectives, etc.) that relate to the installed software product. Processing performed to prepare for the risk assessment thereafter returns to the calling routine (see FIG. 4) at 595.

FIG. 6 is a flowchart showing steps performed in assessing risk of the change to the software product based on vendor supplied data. Processing commences at 600, whereupon, at step 610, a comparison is made between the associated configuration items 304 provided by the vendor (e.g., functions affected by the change, etc.) and the customer's configuration data 322 (the current version of the software product installed at the customer's installation and the features of the software product enabled for use by the customer). A risk value is assigned based on the comparison and stored in vendor risk data store 440.

At step 620, release timeline 306 and age of the change 308 provided by the vendor are compared with the customer's timing data for the software product, such as the amount of time the customer has spent at various release levels of the software product. A risk value is assigned based on the comparison and stored in vendor risk data store 440.

At step 630, the type of release 310 being made in the software change package is retrieved and analyzed with the analysis directed at the risk inherent with different types of releases (e.g., minor bug fix, major new feature release, etc.). A risk value is assigned based on the analysis and stored in vendor risk data store 440.

At step 640, the importance of the change 312 being made to the software change package is retrieved and analyzed with the analysis directed at the risk inherent with different levels of importance based on the change (e.g., cosmetic features vs. addressing a major security flaw in the software product, etc.). Applying a change that simply addresses a cosmetic issue is more risky (less worthwhile) than applying a change that addresses a major security flaw in the software product. A risk value is assigned based on the analysis and stored in vendor risk data store 440.

At step 650, the type of testing performed on the change 314 is retrieved and analyzed with the analysis directed at the risk inherent with levels of testing (e.g., a quick function test vs. a full integrated test of the software product, etc.). A risk value is assigned based on the analysis and stored in vendor risk data store 440.

At step 660, the size of the change 316 (e.g., amount of software code added, deleted, modified, etc.) is retrieved and analyzed with the analysis directed at the risk inherent with the size of the change as substantially more new and modified code increases the likelihood that bugs or functional errors may have inadvertently been introduced to the software product by way of the software change package. A risk value is assigned based on the analysis and stored in vendor risk data store 440. Processing of the vendor data thereafter returns to the calling routine (see FIG. 4) at 695.

FIG. 7 is a flowchart showing steps performed in assessing risk of the change to the software product based on supportive data available to the customer. Processing commences at 700, whereupon, at step 710, support data is selected from a first customer that has installed the software product. Data regarding the selected customer is shown with particular data items that are analyzed by the process as described below.

Figure 8:
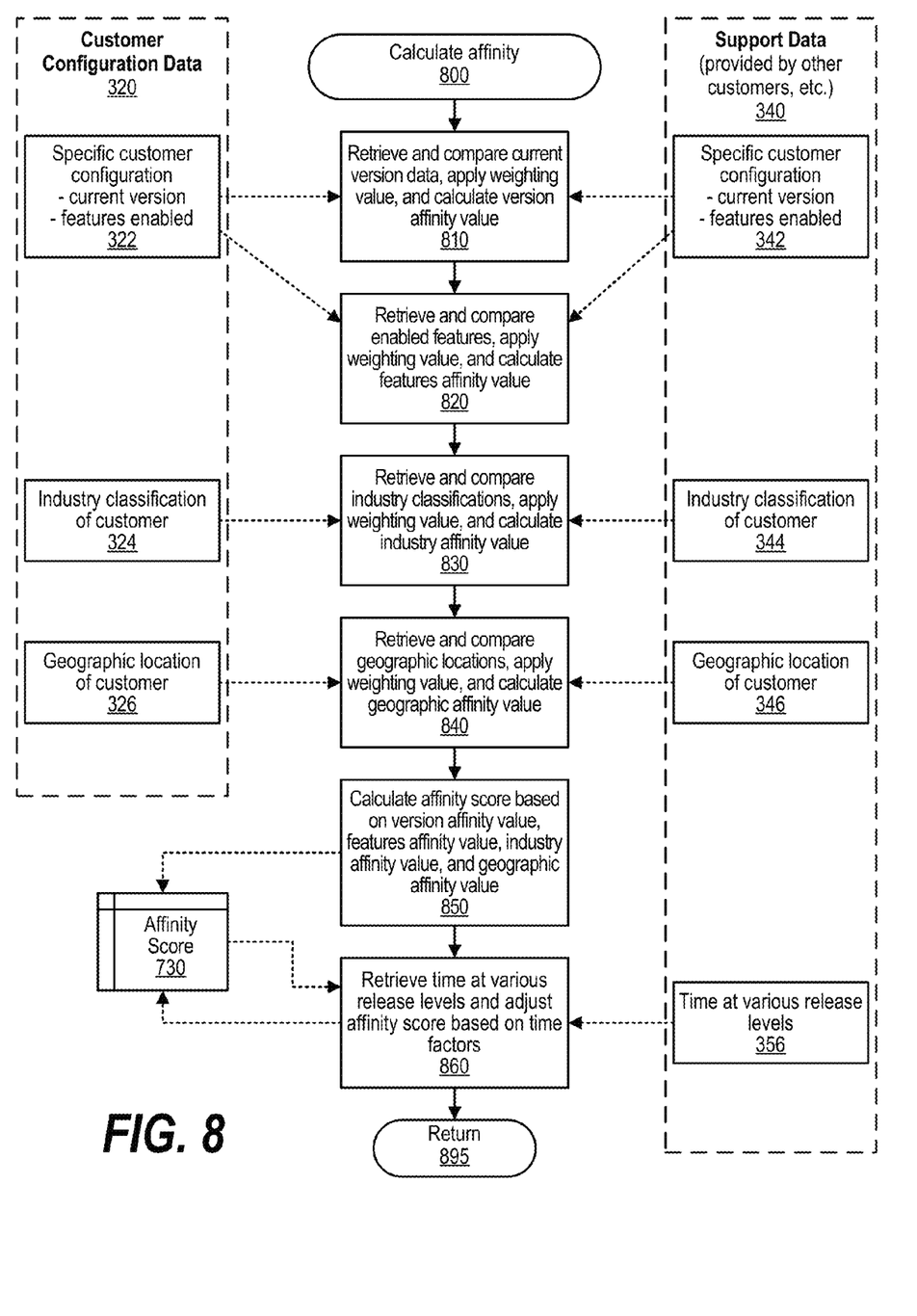
FIG. 8 is a flowchart showing steps performed to calculate the affinity of a customer to another consumer entity.

At predefined process 720, an affinity score is calculated based on a comparison of the customer's configuration data (the customer running the risk assessment) and the selected customer (the customer selected at step 710). The affinity score measures how similar the selected customer is to the customer that is running the risk assessment. Predefined process stores the affinity score in memory area 730. Details of predefined process 720 used to calculate the affinity score are shown in FIG. 8. The more similar the selected customer is found to be to the customer running the risk assessment, the more relevant (and weighted) the selected customer's experience with the software change package will be in assigning a risk value. For example, feedback data from another customer in a similar industry, running a similar configuration of the software product with the same features enabled, with a similar size and geographical setting and similar times at the various release levels is more valuable than another customer with vastly different characteristics (configuration, industry classification, geography, etc.) than the customer that is running the risk assessment.

At step 740, load data for the selected customer is retrieved. The affinity score value is used to adjust the load data based on how similar the selected customer is to the customer running the assessment data. The weighting value, if supplied by the customer running the assessment, is used to further adjust the load data based on the importance of this data item to the customer's overall risk assessment. A risk value is assigned based on load of the systems in light of the affinity value and the weighting value and the risk value is stored in support risk data store 440.

At step 750, perceived stability data for the selected customer is retrieved. The affinity score value is used to adjust the perceived stability data based on how similar the selected customer is to the customer running the assessment data. The weighting value, if supplied by the customer running the assessment, is used to further adjust the perceived stability data based on the importance of this data item (perceived stability) to the customer's overall risk assessment. A risk value is assigned based on perceived stability of the systems in light of the affinity value and the weighting value and the risk value is stored in support risk data store 440.

At step 760, satisfaction level data for the selected customer is retrieved. The affinity score value is used to adjust the satisfaction level data based on how similar the selected customer is to the customer running the assessment data. The weighting value, if supplied by the customer running the assessment, is used to further adjust the satisfaction level data based on the importance of this data item (satisfaction level) to the customer's overall risk assessment. A risk value is assigned based on satisfaction level of the systems in light of the affinity value and the weighting value and the risk value is stored in support risk data store 440.

A decision is made as to whether there are additional support data files corresponding to other customers of the installed software product that need to be processed (decision 770). If there are more support data files to process, then decision 770 branches to the "yes" branch which loops back to select the next customer support data file, calculate an affinity score, and process the support data items as described above. This looping continues until all of the support data files have been processed, at which point decision 770 branches to the "no" branch and processing returns to the calling routine (see FIG. 4) at 795.

FIG. 8 is a flowchart showing steps performed to calculate the affinity of a customer to another consumer entity. Processing commences at 800, whereupon, at step 810, the current version 322 being run by the customer running the risk analysis (customer configuration data 320) is compared with the current version 342 being run by the customer that is providing the support data (support data 340). A weighting value, if supplied by the customer running the risk analysis, is used to adjust the version affinity value upwards or downwards based on the weighting value.

At step 820, the enabled features 322 being run by the customer running the risk analysis (customer configuration data 320) is compared with the enabled features 342 being run by the customer that is providing the support data (support data 340). A weighting value, if supplied by the customer running the risk analysis, is used to adjust the features affinity value upwards or downwards based on the weighting value.

At step 830, the industry classification 324 of the customer running the risk analysis (customer configuration data 320) is compared with the industry classification 344 of the customer that is providing the support data (support data 340). A weighting value, if supplied by the customer running the risk analysis, is used to adjust the industry affinity value upwards or downwards based on the weighting value.

At step 840, the geography classification 326 of the customer running the risk analysis (customer configuration data 320) is compared with the geography classification 346 of the customer that is providing the support data (support data 340). A weighting value, if supplied by the customer running the risk analysis, is used to adjust the geography affinity value upwards or downwards based on the weighting value.

At step 850, affinity score 730 is initially calculated based on the version affinity value, the features affinity value, the industry affinity value, and the geography affinity value. At step 860, the time at which the customer providing the support data is at the current release level (e.g., after applying the software change package, etc.) is used to adjust the affinity score based on timing factors. For example, support data from a customer that applied the software change package several months ago and has been using the software product for some time with the changes applied may be more valuable than support data from a customer that just recently applied the software change package to their installed software product. Processing thereafter returns to the calling routine (see FIG. 7) at 895.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system comprising:
    retrieving first customer configuration data, corresponding to a first customer, that identifies one or more first customer enabled features of a software product installed on the information handling system;
    receiving second customer configuration data, corresponding to one or more second customers, that identifies one or more second customer enabled features of an upgraded software product, wherein the second customer configuration data corresponds to one or more installations of the upgraded software product comprising the installed software product after application of a software change package;
    generating an affinity score based upon comparing the first customer enabled features to the second customer enabled features; and
    generating an upgrade risk map based on the affinity score.

2. The method of claim 1 further comprising:
    receiving evaluation data that includes a plurality of feedback data provided by a plurality of customers that previously installed the software change package to a plurality of customer-installed software products similar to the installed software product.

3. The method of claim 2 wherein the plurality of feedback data is selected from a group consisting of, a customer industry classification, a customer geographic location, a system load value, a customer perceived system stability value, a customer satisfaction level, and an installed time of the plurality of changes.

4. The method of claim 2 further comprising:
    receiving change metadata that includes a plurality of vendor-generated change data resulting from a software development life cycle utilized by a vendor of the installed software product, wherein the software change package is received from the vendor, and wherein the vendor-generated change data is selected from the group consisting of a release timeline, an age of the one or more changes, a type of release, an importance of the one or more changes, a testing description corresponding to the one or more changes, and a size of the one or more changes.

5. The method of claim 4 further comprising:
    comparing the vendor-generated change data with the first customer configuration data; and
    assigning one or more risk values based on the comparison of the vendor-generated change data with the first customer configuration data.

6. The method of claim 5 further comprising:
    weighting one or more risk factors selected from the group consisting of the vendor-generated change data and the plurality of feedback data, wherein the weighting is based on one or more requirements that correspond to a customer of the installed software product, and wherein the weighting results in a plurality of weighting factors;
    identifying a plurality of vendor risk factors based on the vendor-generated change data and the plurality of weighting factors corresponding to the vendor-generated change data;
    identifying a plurality of support data risk factors based on the plurality of feedback data and the plurality of weighting factors corresponding to the feedback data; and
    calculating one or more risk values based upon the plurality of vendor risk factors and the plurality of support data risk factors, wherein each of the risk values correspond to one of the changes included in the software change package, wherein the calculated risk values are included in the generated upgrade risk map.

7. An information handling system comprising:
    one or more processors;
    a memory coupled to at least one of the processors;
    a set of instructions stored in the memory and executed by at least one of the processors, wherein the set of instructions perform actions of:
        retrieving first customer configuration data, corresponding to a first customer, that identifies one or more first customer enabled features of a software product installed on the information handling system;
        receiving second customer configuration data, corresponding to one or more second customers, that identifies one or more second customer enabled features of an upgraded software product, wherein the second customer configuration data corresponds to one or more installations of the upgraded software product comprising the installed software product after application of a software change package;
        generating an affinity score based upon comparing the first customer enabled features to the second customer enabled features; and
        generating an upgrade risk map based on the affinity score.

8. The information handling system of claim 7 wherein the set of instructions performs additional actions comprising;
    receiving evaluation data that includes a plurality of feedback data provided by a plurality of customers that previously installed the software change package to a plurality of customer-installed software products similar to the installed software product.

9. The information handling system of claim 8 wherein the plurality of feedback data is selected from a group consisting of a customer industry classification, a customer geographic location, a system load value, a customer perceived system stability value, a customer satisfaction level, and an installed time of the plurality of changes.

10. The information handling system of claim 7 wherein the set of instructions performs additional actions comprising:
receiving change metadata that includes a plurality of vendor-generated change data resulting from a software development life cycle utilized by a vendor of the installed software product, wherein the software change package is received from the vendor, and wherein the vendor-generated change data is selected from the group consisting of a release timeline, an age of the one or more changes, a type of release, an importance of the one or more changes, a testing description corresponding to the one or more changes, and a size of the one or more changes.

11. The information handling system of claim 10 wherein the set of instructions performs additional actions comprising:
comparing the vendor-generated change data with the first customer configuration data; and
assigning one or more risk values based on the comparison of the vendor-generated change data with the first customer configuration data comparisons.

12. The information handling system of claim 11 wherein the set of instructions performs additional actions comprising:
weighting one or more risk factors selected from the group consisting of the vendor-generated change data and the plurality of feedback data, wherein the weighting is based on one or more requirements that correspond to a customer of the installed software product, and wherein the weighting results in a plurality of weighting factors;
identifying a plurality of vendor risk factors based on the vendor-generated change data and the plurality of weighting factors corresponding to the vendor-generated change data;
identifying a plurality of support data risk factors based on the plurality of feedback data and the plurality of weighting factors corresponding to the feedback data; and
calculating one or more risk values based upon the plurality of vendor risk factors and the plurality of support data risk factors, wherein each of the risk values correspond to one of the changes included in the software change package, wherein the calculated risk values are included in the generated upgrade risk map.

13. A computer program product stored in a computer readable storage device, comprising functional descriptive material that, when executed by an information handling system, causes the information handling system to perform actions comprising:
retrieving first customer configuration data, corresponding to a first customer, that identifies one or more first customer enabled features of a software product installed on the information handling system;
receiving second customer configuration data, corresponding to one or more second customers, that identifies one or more second customer enabled features of an upgraded software product, wherein the second customer configuration data corresponds to one or more installations of the upgraded software product comprising the installed software product after application of a software change package;
generating an affinity score based upon comparing the first customer enabled features to the second customer enabled features; and
generating an upgrade risk map based on the affinity score.

14. The computer program product of claim 13 wherein the actions further comprise:
receiving evaluation data that includes a plurality of feedback data provided by a plurality of customers that previously installed the software change package to a plurality of customer-installed software products similar to the installed software product.

15. The computer program product of claim 14 wherein the plurality of feedback data is selected from a group consisting of a customer industry classification, a customer geographic location, a system load value, a customer perceived system stability value, a customer satisfaction level, and an installed time of the plurality of changes.

16. The computer program product of claim 13 wherein the actions further comprise:
receiving change metadata that includes a plurality of vendor-generated change data resulting from a software development life cycle utilized by a vendor of the installed software product, wherein the software change package is received from the vendor, and wherein the vendor-generated change data is selected from the group consisting of a release timeline, an age of the one or more changes, a type of release, an importance of the one or more changes, a testing description corresponding to the one or more changes, and a size of the one or more changes.

17. The computer program product of claim 16 wherein the actions further comprise:
comparing the vendor-generated change data with the first customer configuration data;
assigning one or more risk values based on the comparison of the vendor-generated change data with the first customer configuration data;
weighting one or more risk factors selected from the group consisting of the vendor-generated change data and the plurality of feedback data, wherein the weighting is based on one or more requirements that correspond to a customer of the installed software product, and wherein the weighting results in a plurality of weighting factors;
identifying a plurality of vendor risk factors based on the vendor-generated change data and the plurality of weighting factors corresponding to the vendor-generated change data;
identifying a plurality of support data risk factors based on the plurality of feedback data and the plurality of weighting factors corresponding to the feedback data; and
calculating one or more risk values based upon the plurality of vendor risk factors and the plurality of support data risk factors, wherein each of the risk values correspond to one of the changes included in the software change package, wherein the calculated risk values are included in the generated upgrade risk map.

* * * * *